(12) United States Patent
Jordan et al.

(10) Patent No.: US 11,503,781 B1
(45) Date of Patent: Nov. 22, 2022

(54) HILLSIDE AGRICULTURAL IRRIGATION APPARATUS

(71) Applicants: Terry B. Jordan, Avondale, AZ (US); Catherine A. Jordan, Avondale, AZ (US)

(72) Inventors: Terry B. Jordan, Avondale, AZ (US); Catherine A. Jordan, Avondale, AZ (US)

( * ) Notice: Subject to any disclaimer, the term of this patent is extended or adjusted under 35 U.S.C. 154(b) by 0 days.

(21) Appl. No.: 17/321,468

(22) Filed: May 16, 2021

Related U.S. Application Data (63) Continuation of application No. 16/862,215, filed on Apr. 29, 2020, now Pat. No. 11,006,588.

(51) Int. Cl.
*F16L 3/12* (2006.01)
*A01G 25/02* (2006.01)

(52) U.S. Cl.
CPC ............. *A01G 25/02* (2013.01); *F16L 3/12* (2013.01); *F16L 3/1211* (2013.01); *F16L 3/1215* (2013.01)

(58) Field of Classification Search
CPC ...... A01G 25/02; F16L 3/1211; F16L 3/1215; F16L 3/12; F16L 3/1222; B01F 3/0412; B01F 2003/0417
See application file for complete search history.

(56) References Cited

U.S. PATENT DOCUMENTS

| | | | |
|---|---|---|---|
| 2,721,764 A | 10/1955 | Wilson, Jr. | |
| 2,998,217 A | 8/1961 | Englis et al. | |
| 3,030,031 A | 4/1962 | Barker | |
| 3,091,401 A | 5/1963 | Hruby, Jr. | |
| 3,170,663 A | 2/1965 | Fite | |
| 3,568,455 A * | 3/1971 | McLaughlin et al. | E03F 3/06 138/105 |
| 3,810,364 A | 5/1974 | Johnson | |
| 4,043,139 A * | 8/1977 | Scott | F16L 1/06 248/156 |
| 4,126,012 A | 11/1978 | Waller | |
| 4,164,323 A | 8/1979 | Ellison | |
| 4,335,868 A | 6/1982 | Ribbert | |
| 4,389,034 A * | 6/1983 | Suttles | F16L 1/201 405/172 |
| 4,492,493 A | 1/1985 | Webb | |
| 4,779,800 A | 10/1988 | Tuomi | |
| 4,800,916 A | 1/1989 | Lakey | |
| 4,826,111 A | 5/1989 | Ismert | |
| 4,948,293 A | 8/1990 | Smith | |
| 5,007,768 A * | 4/1991 | Waller | F16L 1/028 405/172 |

(Continued)

*Primary Examiner* — Nkeisha Smith
(74) *Attorney, Agent, or Firm* — Parsons & Goltry, PLLC; Michael W. Goltry; Robert A. Parsons (57) ABSTRACT

A hillside agricultural irrigation apparatus includes an agricultural irrigation pipe extending across a slope of hillside in a direction that is transverse to the slope, and braces coupled between the agricultural irrigation pipe and the hillside for disabling the agricultural irrigation pipe from sliding or rolling down the hillside, the braces are spaced apart longitudinally along the agricultural irrigation pipe and each includes a collar on the agricultural irrigation pipe, and at least one anchor coupled between the collar and the hillside anchoring the collar to the hillside disabling the agricultural irrigation pipe from sliding or rolling down the hillside.

6 Claims, 12 Drawing Sheets

(56) References Cited

U.S. PATENT DOCUMENTS

| | | | |
|---|---|---|---|
| 5,242,247 A * | 9/1993 | Murphy | F16L 1/028 405/157 |
| 5,437,424 A | 8/1995 | Netz, Sr. | |
| 5,553,975 A * | 9/1996 | Elkins | E03F 3/06 405/184.5 |
| 5,556,032 A | 9/1996 | Varrichione | |
| 5,687,910 A | 11/1997 | King | |
| 6,250,847 B1 * | 6/2001 | Bingham, Jr. | F16L 3/1211 248/87 |
| 6,336,770 B1 | 1/2002 | Evans | |
| 6,527,246 B1 * | 3/2003 | Stinnett | F16L 1/06 248/530 |
| 6,666,415 B2 | 12/2003 | Hansen | |
| 7,441,732 B2 | 10/2008 | Ferragut et al. | |
| 8,020,814 B2 * | 9/2011 | Geppert | F16L 3/12 248/74.1 |
| 8,714,496 B2 | 5/2014 | Blanchard et al. | |
| 8,759,682 B2 | 6/2014 | Devouge | |
| 8,882,057 B2 | 11/2014 | Dworak, Jr. | |
| 8,905,361 B2 | 12/2014 | Gollin et al. | |
| 9,010,697 B1 | 4/2015 | Kirschner | |
| 9,222,602 B2 | 12/2015 | Dworak, Jr. | |
| 9,561,393 B2 * | 2/2017 | Shoap | A62C 33/04 |
| 10,753,514 B2 * | 8/2020 | Tran | F16L 3/1008 |
| 10,781,941 B1 * | 9/2020 | Gregory | F16L 3/04 |
| 2003/0071174 A1 * | 4/2003 | Jager | B01F 23/2311 248/74.1 |
| 2004/0046048 A1 | 3/2004 | Hsu | |
| 2006/0035507 A1 | 2/2006 | Miles et al. | |
| 2009/0200435 A1 | 8/2009 | Duggan | |
| 2011/0186658 A1 | 8/2011 | Wuchert | |
| 2013/0168510 A1 | 7/2013 | Dworak, Jr. | |
| 2013/0187014 A1 | 7/2013 | James | |
| 2013/0313375 A1 * | 11/2013 | Dworak, Jr. | F16L 3/1083 248/74.1 |
| 2015/0204462 A1 | 7/2015 | Hutchinson | |
| 2015/0219142 A1 * | 8/2015 | Weatherl | F16B 39/24 29/433 |
| 2016/0091132 A1 | 3/2016 | Suzuki et al. | |
| 2016/0131281 A1 * | 5/2016 | Juzak | F16B 35/06 248/74.3 |
| 2017/0268459 A1 * | 9/2017 | Alletto | F02F 7/0068 |
| 2018/0172052 A1 | 6/2018 | Gray | |

* cited by examiner

HILLSIDE AGRICULTURAL IRRIGATION APPARATUS

FIELD OF THE INVENTION

The present invention relates to agricultural irrigation, the delivery of irrigation water to agricultural land, and, more particularly, to a hillside agricultural irrigation apparatus for delivering irrigation water to a hillside and associated methods of securing an agricultural irrigation pipe to a slope of a hillside.

BACKGROUND OF THE INVENTION

Agricultural irrigation is the application of irrigation water to an agricultural crop. There are several methods of irrigation, which vary in how the irrigation water is applied to the agricultural crop. Common irrigation methods include surface irrigation, micro-irrigation, drip irrigation, sprinkler irrigation, center pivot irrigation, and lateral move irrigation.

Of significance is surface irrigation. Surface irrigation is the oldest form of irrigation, in which water moves across the surface of an agricultural land to wet it and infiltrate the soil. Surface irrigation is often called flood irrigation when the irrigation results in flooding or near flooding of the cultivated land. Historically, this has been the most common method of irrigating agricultural land and is still used in most parts of the world.

A common form of surface irrigation involves installing a series of agricultural irrigation pipes directly on the ground adjacent to of the agricultural land to be irrigated. The pipes, which are customarily made of plastic, polyvinyl chloride (PVC), or the like, are configured to receive irrigation water and dispense it to the surface of the agricultural land, such as by longitudinally spaced apart openings, spouts, or sprinkler heads formed in the pipes. The pipes vary in size, typically from ½ inch to 24 inches depending on the needs of the agricultural irrigation application.

Agricultural land, land devoted to agriculture, often includes hillside areas. To surface irrigate a hillside, the pipe is set onto across the hillside in a direction that is transverse to its slope; this results in an even application of irrigation water across the hillside, which flows downwardly along the sloped ground to wet it and infiltrate the soil. Water to an agricultural pipe extending across a hillside inherently weighs down the pipe, which can cause it to slide or roll down the sloped ground thereby disrupting irrigation efficiency and precision.

SUMMARY OF THE INVENTION

According to the principle of the invention, a hillside agricultural irrigation apparatus includes an agricultural irrigation pipe extending across a slope of hillside in a direction that is transverse to the slope, and braces coupled between the agricultural irrigation pipe and the hillside for disabling the agricultural irrigation pipe from sliding or rolling down the hillside. The braces are spaced apart longitudinally along the agricultural irrigation pipe and each includes a collar on the agricultural irrigation pipe, and an anchor coupled between an uphill side of the collar and the hillside anchoring the collar to the hillside disabling the agricultural irrigation pipe from sliding or rolling down the hillside. The collar is releasably connected to the agricultural irrigation pipe. The anchor includes a stake coupled to the collar and staked into the hillside. The stake is releasably coupled to the collar. The collar is configured with an aperture coupled in fluid communication with the irrigation water pipe. The aperture is coupled in fluid communication with the irrigation water pipe by a device designed to control the direction or characteristics of a fluid flow.

According to the principle of the invention, a hillside agricultural irrigation apparatus includes an agricultural irrigation pipe extending across a slope of hillside in a direction that is transverse to the slope, and braces coupled between the agricultural irrigation pipe and the hillside for disabling the agricultural irrigation pipe from sliding or rolling down the hillside. The braces are spaced apart longitudinally along the agricultural irrigation pipe and each includes a collar on the agricultural irrigation pipe, an extension extending uphill along the hillside from an uphill side of the collar, and an anchor coupled between the extension and the hillside anchoring the collar to the hillside disabling the agricultural irrigation pipe from sliding or rolling down the hillside. the collar is releasably connected to the agricultural irrigation pipe. The anchor includes a stake coupled to the collar and staked into the hillside. The stake is releasably coupled to the extension. The collar is configured with an aperture coupled in fluid communication with the irrigation water pipe. The aperture is coupled in fluid communication with the irrigation water pipe by a device designed to control the direction or characteristics of a fluid flow.

According to the principle of the invention, a hillside agricultural irrigation apparatus includes an agricultural irrigation pipe extending across a slope of hillside in a direction that is transverse to the slope, and braces coupled between the agricultural irrigation pipe and the hillside for disabling the agricultural irrigation pipe from sliding or rolling down the hillside. The braces are spaced apart longitudinally along the agricultural irrigation pipe and each includes a collar about the agricultural irrigation pipe, the collar being split defining opposed first and second ends, an upper ear and a lower ear carried by the collar proximate to the first end and the second end, respectively, the upper ear overlies the lower ear, and both the upper ear and the lower ear concurrently extend uphill along the hillside from an uphill side of the collar and are secured tightening the collar about the agricultural irrigation pipe, and an anchor coupled between the hillside and both the upper ear and the lower ear anchoring the collar to the hillside disabling the agricultural irrigation pipe from sliding or rolling down the hillside. the upper ear and the lower ear are secured by a clamp assembly. In an alternate embodiment, the upper ear and the lower ear are secured by at least one fastener. The anchor includes a stake staked into the hillside and coupled to both the first ear and the second ear. The stake extends through a first opening and a second opening through the upper ear and the lower ear, respectively. The collar is configured with an aperture coupled in fluid communication with the irrigation water pipe. The aperture is coupled in fluid communication with the irrigation water pipe by a device designed to control the direction or characteristics of a fluid flow.

BRIEF DESCRIPTION OF THE DRAWINGS

Specific objects and advantages of the invention will become readily apparent to those skilled in the art from the following detailed description of illustrative embodiments thereof, taken in conjunction with the drawings in which.

DETAILED DESCRIPTION

A hillside agricultural irrigation apparatus and methods of securing an agricultural irrigation pipe to a slope of a hillside are disclosed.

Figure 1:
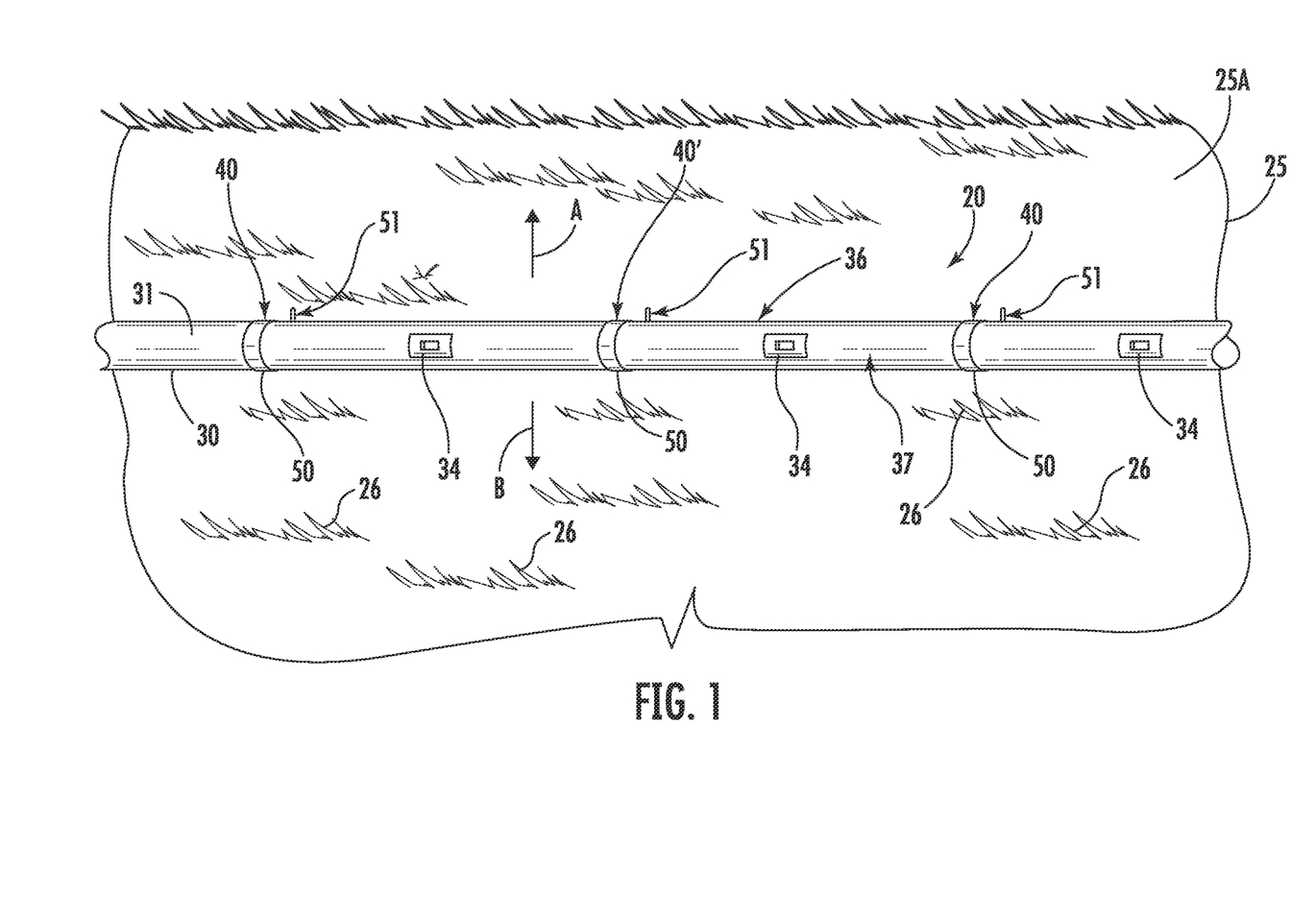
FIG. 1 illustrates a hillside agricultural irrigation apparatus including an agricultural irrigation pipe extending across a slope of a hillside in a direction that is transverse to the slope, and braces coupled between the agricultural irrigation pipe and the hillside for disabling the agricultural irrigation pipe from sliding or rolling down the hillside.

Turning now to the drawings, in which like reference numerals indicate corresponding elements throughout the several views, attention is first directed to FIG. 1 illustrating a hillside agricultural irrigation apparatus 20 for a hillside 25, the side or slope of a hill or ground that has a natural incline or slope, for supplying irrigation water to an agricultural crop 26 planted on hillside 25. Agricultural irrigation apparatus 20 includes an assembly of agricultural irrigation pipe 30, and braces 40. Pipe 30 extends across surface 25A of hillside 25 in a direction that is transverse or perpendicular to the slope of surface 25A hillside 25. Pipe 30 is set directly onto surface 25A of hillside 25, and is a standard agricultural irrigation pipe configured for the conveyance of irrigation water. In this example, longitudinally spaced-apart dispersing elements 34 present on pipe 30 are configured to disperse irrigation water onto surface 25A of hillside 25 from pipe 30 for wetting and infiltrating surface 25A of hillside 25 for beneficially supplying agricultural crop 26 with the irrigation water. According to the invention, coupled between pipe 30 and hillside 25 are braces 40. Braces 40 disable pipe 30 from sliding or rolling down surface 25A of hillside 25 and from rotating relative to surface 25A of hillside 25, especially when pipe 30 is loaded and weighed down with irrigation water. Braces 40 are spaced apart longitudinally on pipe 30 and hillside 25, and are identical. Braces 40 and dispersing elements 34 are also longitudinally spaced apart on for disabling braces 40 and dispersing elements 34 from interfering with each other. Braces 40 are each installed on pipe 30 without modifying pipe 30 and without the need for specialized skill or equipment.

Figure 2:
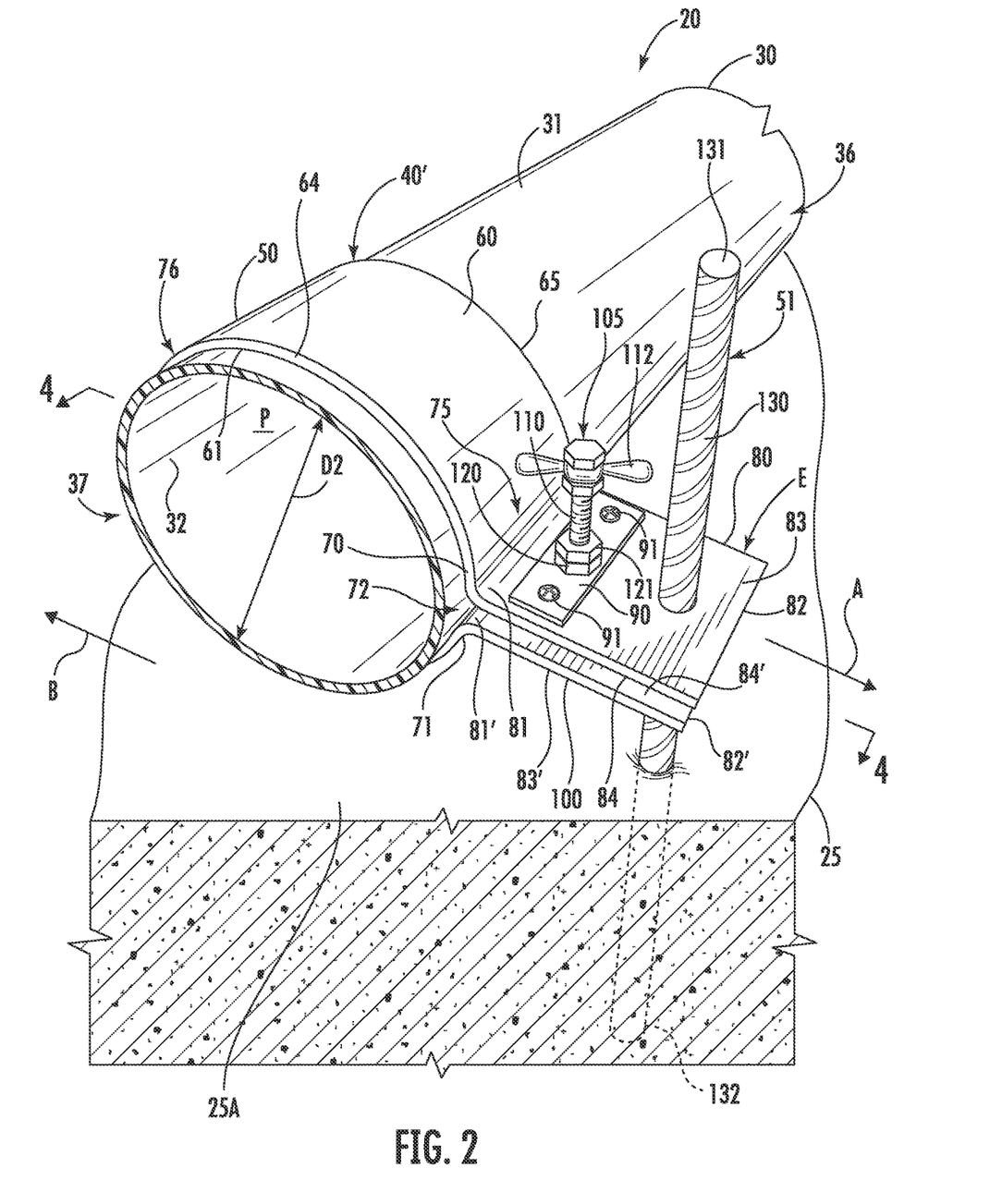
FIG. 2 is a fragmentary view of the pipe of FIG. 1 illustrating a brace including a collar on the agricultural irrigation pipe, and an anchor coupled between an extension of the collar on an uphill side of the collar and the hillside anchoring the collar to the hillside thereby anchoring the pipe to the hillside.
Figure 4:
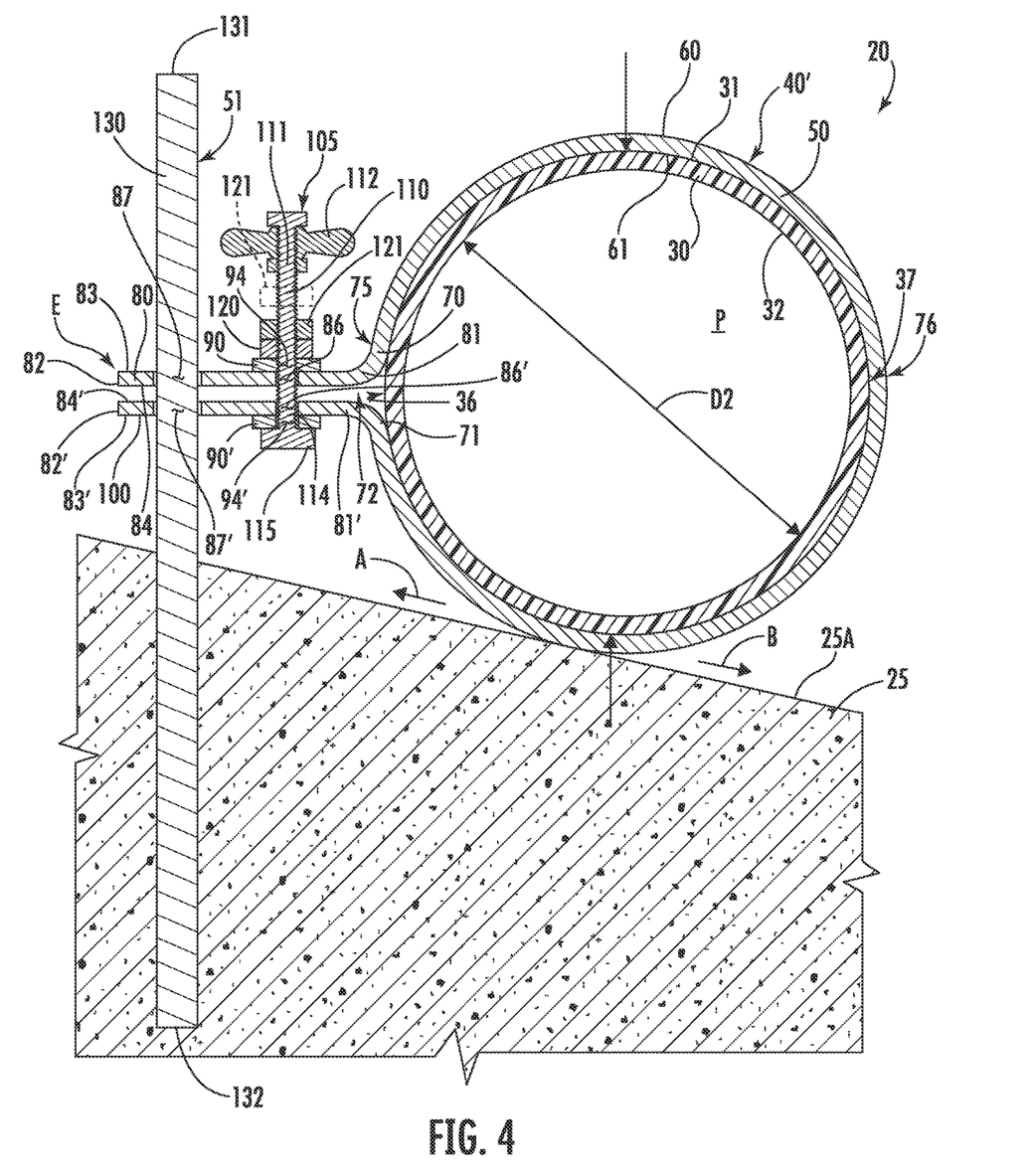
FIG. 4 is a section view taken along line 4-4 of FIG. 2.

Pipe 30 is fashioned of the customary plastic, polyvinyl chloride (PVC), metal, such as aluminum, or other standard material or combination of standard materials commonly used for agricultural pipes used in standard surface irrigation. Referring in relevant part to FIGS. 1, 2, and 4, pipe 30 is an elongate conduit or hollow body or flow section of circular cross-section including circumferential outer surface 31, and circumferential inner surface 32. Circumferential outer surface 31 defines a constant circular outer diameter D1 of pipe 30 in FIG. 4. Circumferential inner surface 32, in turn, defines a constant circular inner diameter D2 of pipe 30 in FIGS. 2 and 4. Referring to FIGS. 2 and 4, inner diameter D2 defines an irrigation water flow pathway P through pipe 30 for the conveyance of irrigation water to the longitudinally spaced-apart dispersing elements 34 present on pipe 30. Dispersing elements 34 are conventional gates, which can be selectively opened and closed as required. Dispersing elements 34 can be sprinklers, sprayers, nozzles, or the like in alternate configurations. Pathway P is through and follows pipe 30. Accordingly, the direction of pathway P through pipe 30 is transverse or perpendicular to the slope of hillside 25. Pipe 30 includes an uphill side, denoted generally at 36 in FIGS. 2 and 4, and an opposite downhill side, denoted generally at 37 in FIGS. 1, 2, and 4. Dispersing elements 34 are formed in downhill side 37 of pipe 30. Inner diameter D1 can be from ½ inch to 24 inches depending on the needs of the agricultural irrigation application, and is from 10 inches to 15 inches in this example as a matter of illustration and reference.

Pipe 30 is generally representative of a standard and readily-available agricultural irrigation pipe useful for surface irrigation. Accordingly, further details of pipe 30 will readily occur to the skilled artisan and will not be discussed in further detail.

Braces 40 are identical. Accordingly, the details of one of braces 40, denoted at 40' in FIG. 1, FIG. 2, and FIG. 4, will now be described in detail, with the understanding that the ensuing discussion of brace 40' applies equally to each brace 40.

Referring in relevant part to FIG. 2, FIG. 3, FIG. 4, and FIG. 4A, brace 40' includes collar 50 and anchor 51. Collar 50 is configured to be attached to pipe 30, and anchor 51 is configured to be coupled between collar 50 and hillside 25 for anchoring pipe 25 to hillside 25 for disabling pipe 30 from sliding or rolling down surface 25A of hillside 25 and from rotating relative to surface 25A of hillside 25 for keeping fluid discharge elements 34 pointed in a chosen direction. Anchor 51 is preferably coupled to collar 50 releasably for ease of assembly and disassembly.

Collar 50 is fabricated of plastic, PVC, metal, such as aluminum, or other material having inherently resilient, flexible, and rugged material characteristics, and is either integrally formed, i.e. unitary, or formed from a plurality of parts rigidly affixed together by welding, adhesive, mechanical fasteners, or other chosen joinery. Collar 50 is an annular member including outer surface 60 and inner surface 61 extending from radial edge 64 to radial edge 65. Collar 50 is split to define spaced-apart ends 70 and 71 of collar 50. End 70 is an upper end of collar 50, and end 71 is a lower end of collar 50. Ends 70 and 71 are parallel to each other, and both concurrently extend from radial edge 64 to radial edge 65. Ends 70 and 71 define a split portion of collar 50 denoted generally at 72. Collar 50 includes an uphill side denoted generally at 75, and an opposed downhill side denoted generally at 76. Split portion 72 of collar 50 defined by upper and lower ends 70 and 71 is at uphill side 75 of collar 50.

Extension E of collar 50 includes ears 80 and 100, each itself being an extension of collar 50. Ears 80 and 100 are formed at split portion 72 at uphill side 75 of collar 50. Ear 80 is an upper ear of collar 50 over ear 100, which is a lower ear of collar 50. Ear 80 is carried by collar 50 adjacent to end 70, and ear 100 is carried by collar 50 adjacent to end 71. Ears 80 and 100 are rigidly affixed to and concurrently extend outwardly in the same direction from upper and lower ends 70 and 71, respectively, from uphill side 75 of collar 50. Ears 80 and 100 are parallel to each other adjacent to ends 70 and 71 at split portion 72 of collar 50, and together form the extension of collar 50 denoted generally at E.

Ears 80 and 100 are flat and coextensive in this example, and are identical in every respect unless noted otherwise. Accordingly, ear 80 will now be discussed, with the understanding that the ensuing discussion of ear 80 applies in every respect to ear 100 unless noted otherwise, in which common reference characters are denoted in the various drawings with a prime ("'") symbol with ear 100 for clarity.

Ear 80 extends laterally across collar 50 from radial edge 64 to radial edge 65, includes proximal end 81, distal end 82, and parallel outer and inner surfaces 83 and 84. Proximal end 81 rigidly affixed to upper end 70, and extends outwardly from both proximal 81 and uphill side 75 of collar 50 to distal end 82. A proximal opening 86 adjacent to proximal end 81 extends centrally through ear 80 from outer surface 83 to inner surface 84. A distal stake-receiving opening 87 adjacent to distal end 82 extends centrally through ear 80 from outer surface 83 to inner surface 84. Secured to outer surface 83 adjacent to proximal end 81 with appropriate screws 91, or rivets, adhesive, welding, or the like in alternate embodiments, is reinforcement plate 90 of metal, ceramic, plastic, or the like. A threaded opening 94 extends centrally through plate 90 and is both over and coaxial with respect to proximal opening 86.

Figure 4A:
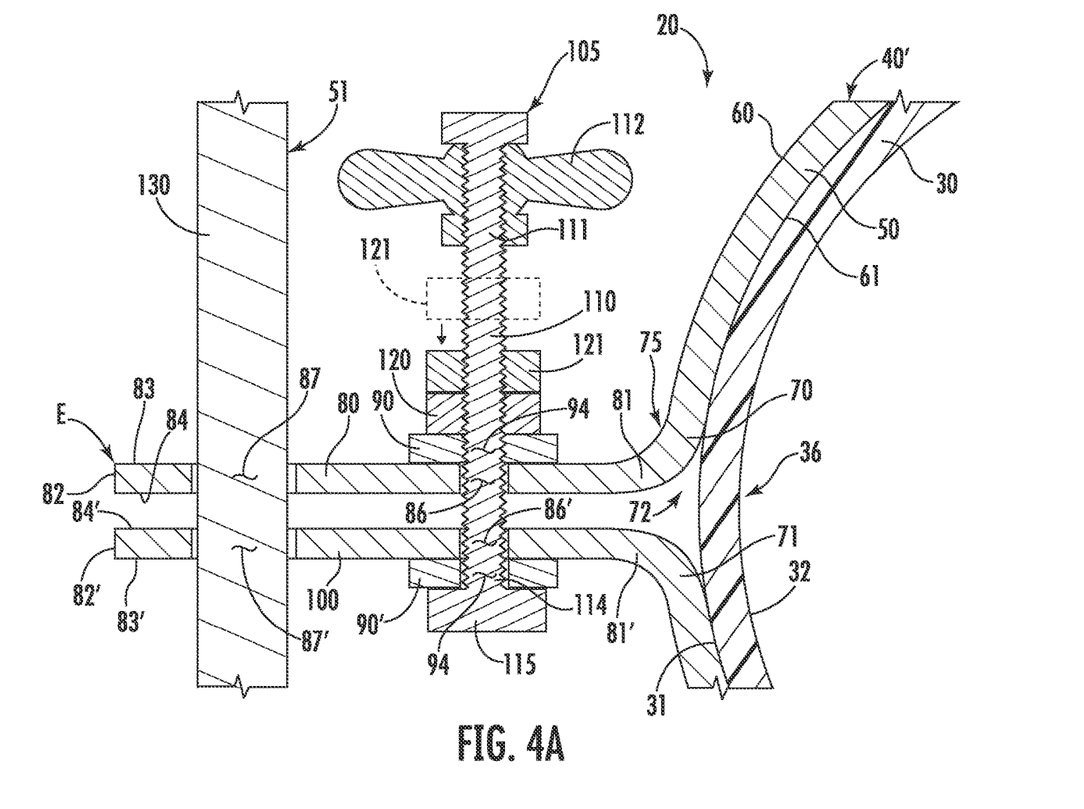
FIG. 4A is an enlarged fragmentary view corresponding to FIG. 4 illustrating ears of the collar secured by a clamp assembly.

Ears 80 and 100 are parallel to each other, and ear 80 overlies ear 100, which is inverted thereby juxtaposing inner surfaces 84 and 84' of the respective ears 80 and 100. Ears 80 and 100 are additionally axially-aligned vertically, whereby proximal openings 86 and 86' and openings 94 and 94' of the respective ears 80 and 100 are coaxial, and stake-receiving openings 87 and 87' of the respective ears 80 and 100 are coaxial, as shown in FIG. 4 and FIG. 4A. Unlike opening 94 of plate 90 of ear 80, opening 94' of plate 90 of ear 100 is not threaded.

Referring to FIGS. 1 and 2, uphill side 36 of pipe 30 faces or otherwise points uphill in the direction of arrow A up the slope of surface 25A of hillside 25, and downhill side 37 of pipe 30 and dispersing elements 34 present on downhill side 37 of pipe 30 face or otherwise point downhill in the opposite direction of arrow B down the slope of surface 25A of hillside 25. Dispersing elements 34 present on downhill side 37 of pipe 30 point downhill in the direction of arrow B, which enables them to efficiently discharge irrigation water from pipe 30 downhill in the direction of arrow B according to conventional practice.

Collar 50 is fitted on circumferential outer surface 31 of pipe 30, whether by inserting pipe 30 through collar 50 or opening collar 50 at split section 72 and applying it over pipe 30, and is tightly clamped about pipe 30 to frictionally engage inner surface 61 of collar 50 tightly and directly against circumferential outer surface 31 of pipe 30, preferably with a force sufficient to disable pipe 30 from rotating relative to collar 50. Collar 50 is installed on pipe 30 before or after it is deployed on hillside 25. The installation of collar 50 on pipe 30 importantly requires no modification to pipe 30.

Uphill side 75 of collar 50 and uphill side 36 of pipe 30 are juxtaposed, and downhill side 76 of collar 50 and downhill side 37 of pipe 30 having dispersing elements 34 are juxtaposed. Accordingly, uphill side 36 of pipe 30 and uphill side 75 of collar concurrently face or point uphill in the direction of arrow A up the slope of surface 25A of hillside 25, and downhill side 37 of pipe 30, dispersing elements 34 present on downhill side 37 of pipe 30, and downhill side 76 of collar 50 concurrently face or point downhill in the direction of arrow B down the slope of surface 25A of hillside 25. Ear 80 overlies ear 100 that overlies surface 25A of hillside 25, and both concurrently extend uphill in the direction of arrow A over surface 25A of hillside 25 from both uphill side 36 of pipe 30 and uphill side 75 of collar 50. Accordingly, extension E of collar 50 defined by ears 80 and 100 extends uphill in the direction of arrow A over surface 25A of hillside 25 from both uphill side 36 of pipe 30 and uphill side 75 of collar 50.

Ears 80 and 100 are secured to tighten collar 50 about pipe 50, i.e. to frictionally secure inner surface 61 of collar 50 tightly and directly against circumferential outer surface 31 of pipe 30. In this example, clamp assembly 105 secures ears 80 and 100 in FIG. 2, FIG. 3, FIG. 4, and FIG. 4A.

Referring appropriately to FIGS. 4 and 4A, clamp assembly 105 includes an externally-threaded and longitudinally straight shank 110 of metal having a proximal end 111 formed with a handle 112, and an opposed distal end 114 formed with an enlarged head 115. Shank 110 is upright and extends downwardly from handle 112 above outer surface 83 of ear 80 to threaded opening 94 of plate 90 of ear 80. Shank 110 is threaded through threaded opening 94 of plate 90 of ear 80 and extends downwardly therefrom through proximal opening 86 of ear 80, proximal opening 86' of ear 100, and through opening 94' of plate 90' of ear 100 to head 115 received directly against the outer side of plate 90' of ear 100. Shank 110 is free to rotate and reciprocate longitudinally relative to openings 86 and 86' and opening 94'.

Handle 112 is taken up by hand and taken advantage of to rotate shank 110 for securing ears 80 and 100 to frictionally clamp collar 50 about pipe 50. The threaded interaction between threaded shank 110 as it rotates and opening 94 of plate 90 of ear 80 toward head 115 advances plate 90 of ear 80 and ear 80 itself along shank 110 toward handle 112, which automatically closes both the distance between plate 90 of ear 80 and head 115 against the outer side of plate 90' of ear 100, and the distance between ears 80 and 100 at split portion 72 between head 115 and plate 90 of ear 80; this secures ears 80 and 110 by closing the distance between them adjacent to split portion 72 to automatically frictionally close/constrict inner surface 61 of collar 50 directly against circumferential outer surface 31 of pipe 30. Ears 80 and 100 are "secured" according to this disclosure when the distance between them adjacent to split portion 72 of collar 50 is sufficiently closed to effect the frictional securement of inner surface 61 of collar 50 directly against circumferential outer surface 31 of pipe 30 with a force sufficient to disable pipe 30 from rotating relative to collar 50. To fix ears 80 and 100 in their secured position, two threaded nuts 120 and 121 are threaded about threaded shank 110 between handle 112 and plate 90. Nut 120 is rotated on shank 110 tightly against the outer side of plate 90, and nut 121, a lock nut, is rotated on shank 110 from its dotted line position in FIGS. 4 and 4A tightly against nut 120.

Anchor 51 secures brace 40' to hillside 25. Referring to FIGS. 2 and 4, coupled between uphill side 75 of collar 50 and hillside 50 anchoring collar 50 to hillside 25 so pipe 30 is supported from uphill and is disabled from sliding or rolling down surface 25A of hillside 25 in the direction of arrow B and from rotating relative to surface 25A of hillside 25 is anchor 51. Extension E of collar 50, ears 80 and 100, extends uphill in the direction of arrow A over surface 25A of hillside 25 from both uphill side 36 of pipe 30 and uphill side 75 of collar 50, and anchor 51 is coupled between hillside 25 and extension E of collar 50 and, more specifically, between hillside 25 and both ears 80 and 100 of collar 50.

In this embodiment, anchor 51 is a stake 130 that is staked into hillside 25 through surface 25A and, at the same time, is coupled to extension E of collar 50. Stake 130 is fashioned or metal, plastic, wood or other material or combination of materials having inherently strong, rigid, and resilient material characteristics, and includes proximal end 131 and distal end 132. Distal end 132 is staked into hillside 25 through surface 25A, and stake 130 extends upright from within hillside 25 through surface 25A uphill from both uphill side 36 of pipe 30 and uphill side 75 of collar 50 and through and beyond stake-receiving openings 87 and 87' of the respective ears 80 and 100 to proximal end 131 above outer surface 83 of ear 80. Stake 130 is coupled between collar 50 and hillside by inserting stake 130 distal end 132 first downwardly through openings 87 and 87' and then staking stake 130 into hillside 25 by driving distal end 132 into hillside 25 through surface 25A by pounding proximal end 131 with a hammer or driver. In an alternate embodiment, stake 130 is staked distal end 132 first into hillside 25 through surface 25A with a hammer or driver, and openings 87 and 87' are concurrently applied over proximal end 131 of end of stake 130. Openings 87 and 87' are sufficiently large to enable them to freely and releasably applied over stake 130 and withdrawn from stake 130. Reversing either operation releases collar 50 from hillside 25.

In FIG. 1, pipe 30 extends across surface 25A of hillside 25 in a direction that is transverse or perpendicular to the slope of surface 25A hillside 25, uphill side 36 of pipe 30 faces or otherwise points uphill in the direction of arrow A up the slope of surface 25A of hillside 25, and downhill side 37 and dispersing elements 34 present on downhill side 37 of pipe 30 face or otherwise point downhill in the direction of arrow B down the slope of surface 25A of hillside 25. Braces 40 are spaced-apart longitudinally along pipe 30, are longitudinally spaced apart from dispersing elements 34, and are each coupled between pipe 30 and hillside 25 as described above in connection with brace 40' for working together to keep pipe 30 in place and orientation relative to surface 25A of hillside 25 by disabling pipe 30 from sliding or rolling down surface 25A of hillside 25 in the direction of arrow B and rotating relative to surface 25A of hillside 25, especially when pipe 30 is loaded and weighed down with irrigation water, according to the principle of the invention. Securing pipe 30 to hillside 25 with braces 40 beneficially keeps pipe 30 in place on the inherently sloped surface 25A of hillside 25, and disables pipe 30 from rotating relative to surface 25A of hillside for keeping dispersing elements 34 pointed in the chosen direction, which is downhill in the direction of arrow B down the slope of surface 25A of hillside 25 in this configuration. For the purposes of illustration and reference, FIG. 1 illustrates a length of pipe 30 secured to hillside 25 with three braces 40. Pipe 30 can have any chosen length depending on the application and can be configured with any chosen number of braces 40 sufficient to hold the position and orientation of pipe 30 relative to surface 25A of hillside 25.

Figure 3:
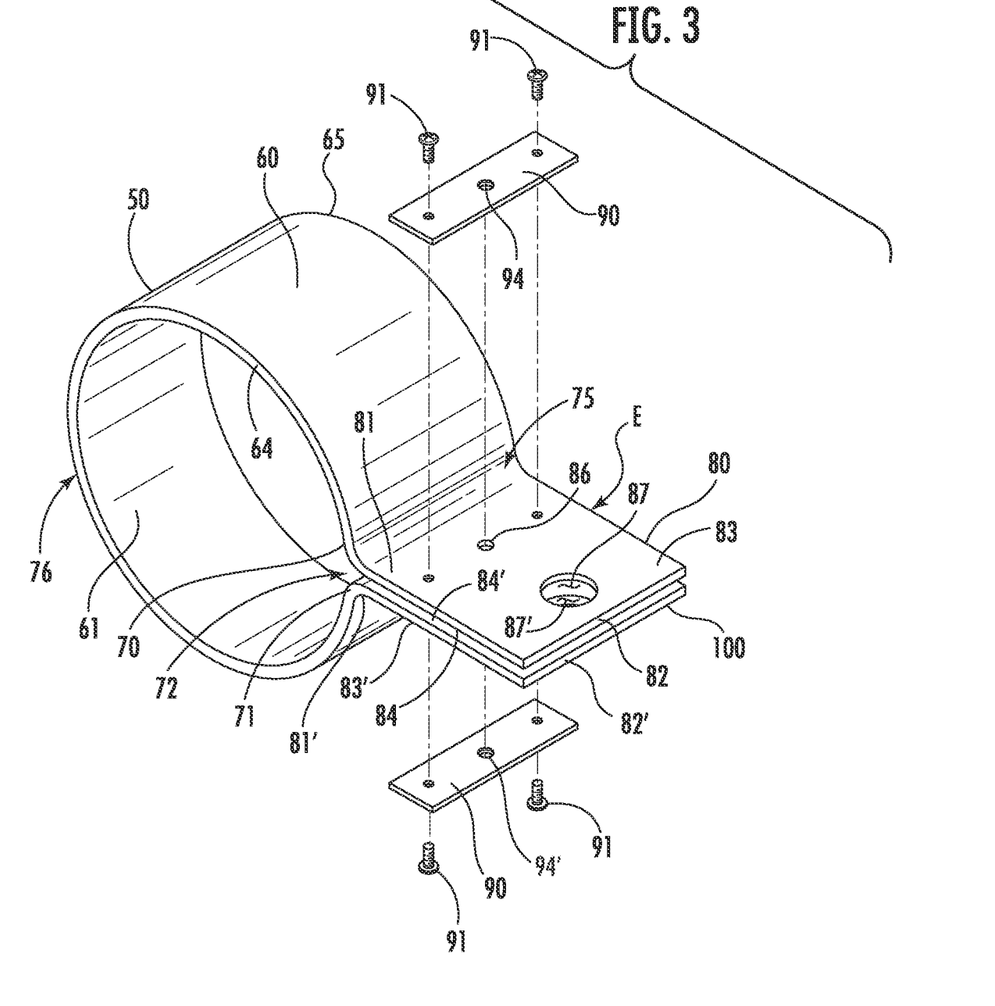
FIG. 3 is an exploded perspective view of the collar of FIG. 2.
Figure 5:
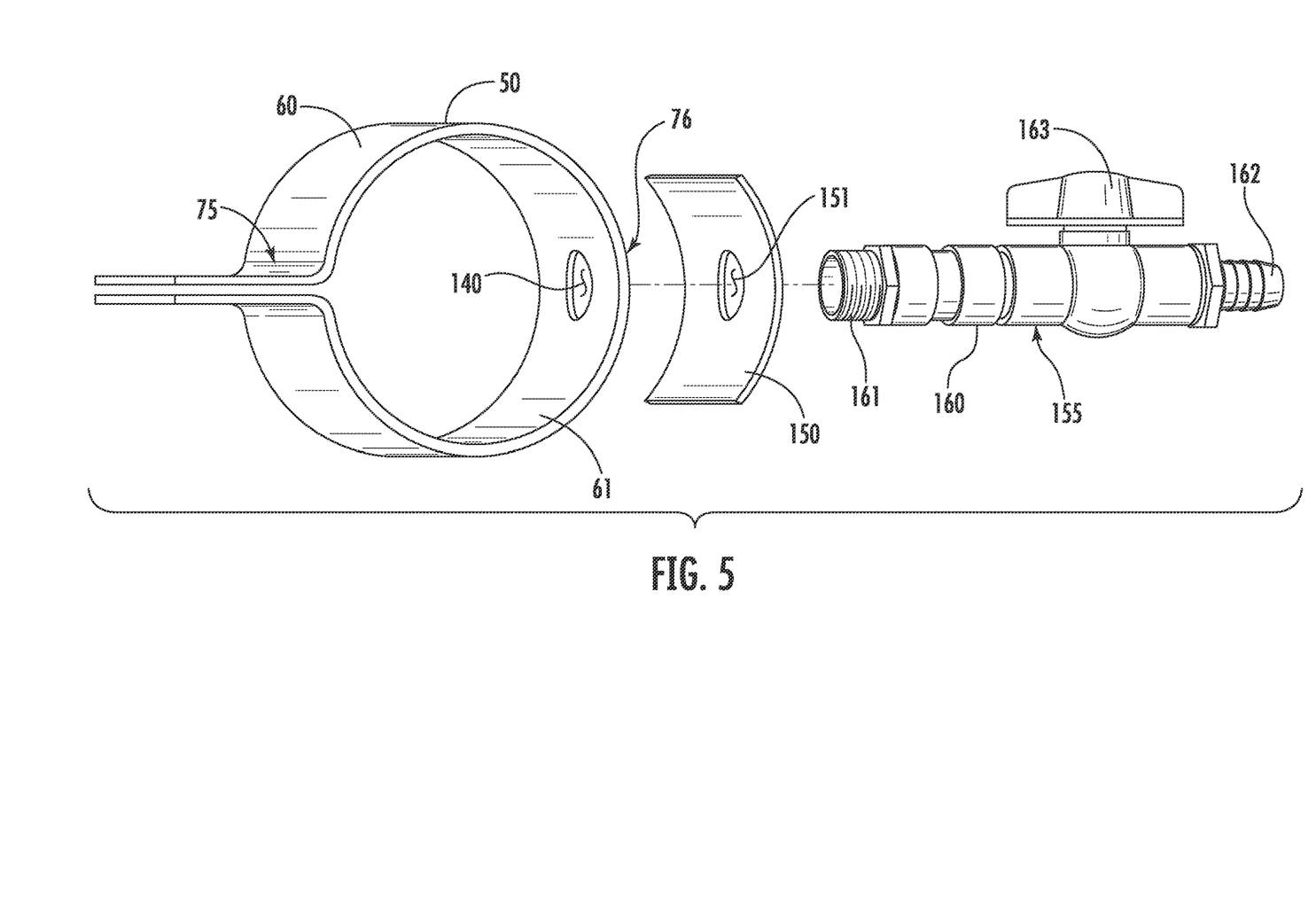
FIG. 5 is an exploded perspective view of a collar configured with a device designed to control the direction or characteristics of a fluid flow.
Figure 6:
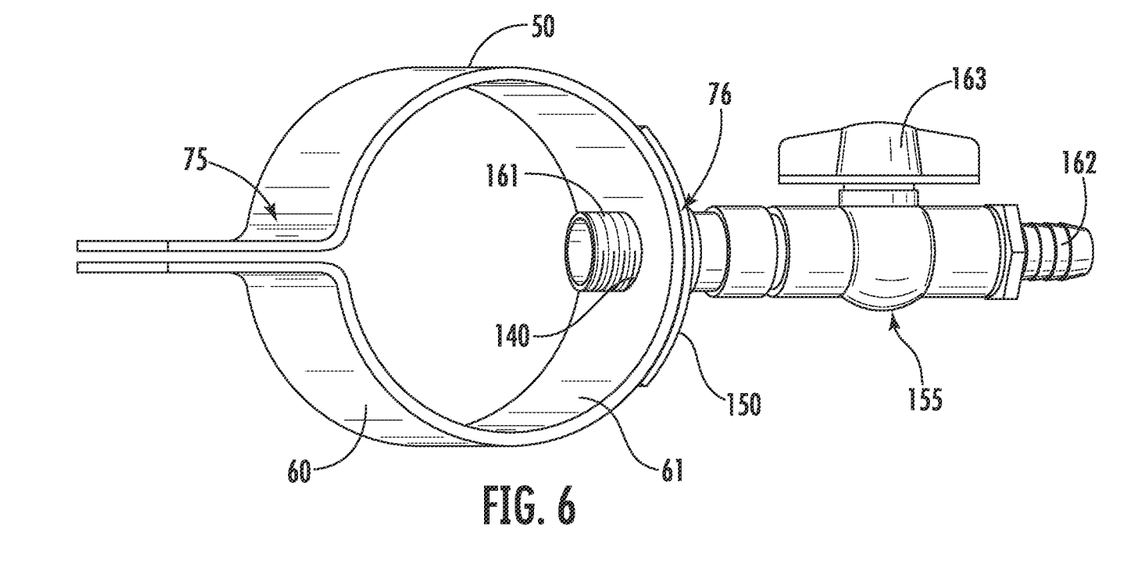
FIG. 6 is a view of the embodiment of FIG. 5 shown assembled.

The present invention is described above with reference to illustrative embodiments. However, those skilled in the art will recognize that changes and modifications may be made in the described embodiment without departing from the nature and scope of the present invention. For instance, a collar of a brace constructed and arranged in accordance with the invention can be configured with an aperture coupled in fluid communication with an irrigation water pipe by a device designed to control the direction or characteristics of a fluid flow. As a matter of example, and with reference in relevant part to FIGS. 5 and 6, collar 50 of FIG. 3 is shown as it would appear fashioned with opening 140, a reinforcement plate 150 including central opening 151, and a device 155 designed to control the direction or characteristics of a fluid flow. In this example, device 155 is a standard irrigation water nozzle 160 including an inlet 161, an outlet 162, and a valve 163 useful for selectively opening and closing nozzle 160. Opening 140 is located at downstream side 76 of collar 50 opposite to its upstream side 75, and extends centrally through downstream side 76 collar 50 from outer surface 60 to inner surface 61. Opening 140 can be located elsewhere along collar 50 as desired. Plate 150 is rigidly affixed to outer surface 60 of collar 50, along downhill side 76 in this example, and is curved to relate to the curvature of outer surface 60. Openings 140 and 151 are coaxial. Inlet 161 is concurrently inserted through openings 140 and 151 thereby operatively coupling openings 140 and 151 to nozzle 160 in fluid communication. Inlet 161 extends outwardly to inner surface 61 of collar 50, through openings 140 and 151, is rigidly affixed to collar 50 and plate 150, and extends outwardly from plate 150 to outlet 162. Device 155 can be a sprinkler, a sprayer, a spout, or the like or similar device for controlling the direction or characteristic of a fluid.

Figure 7:
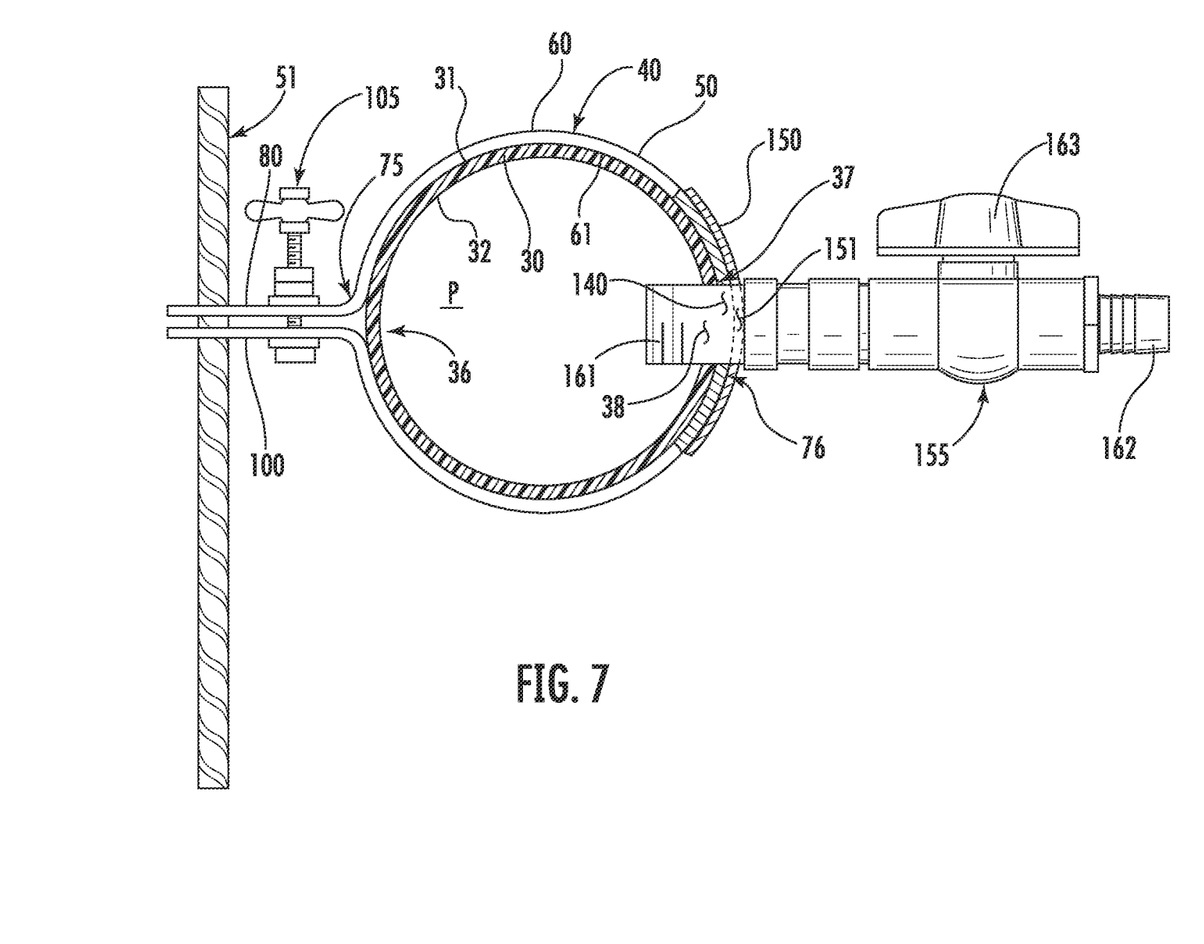
FIG. 7 is a side elevation view of a brace configured with the collar of FIG. 5 and shown as it would appear installed on an agricultural irrigation water pipe, the water pipe and portions of the brace being depicted in cross-section for illustrative purposes.

In FIG. 7, collar 50 is shown secured to pipe 30 as described before with the previously-described brace 40'. In this embodiment, pipe 30 is formed with an opening 38, which extends through pipe 30 from circumferential inner surface 31 to circumferential outer surface 32. Inlet 161 of nozzle 160 extends inwardly into pathway P of pipe 30 through opening 38. Nozzle 160 extends outwardly through opening 38 of pipe 30 and concurrently through opening 140 of collar 50 and opening 151 of plate 150 to outlet 162 from inlet 161 within pathway P of pipe 30. This couples aperture 140 of collar 50 of FIGS. 5, 6, and 7 in fluid communication with pipe 30. Nozzle 160 is configured to receive irrigation water through pathway P of pipe 30 at inlet 161, and discharge it outwardly from pathway P from inlet 161 to outlet 162 onto agricultural land. In this example, opening 38 is formed at downhill side 37 of pipe 30, and nozzle 160 extends outwardly through opening 38 of pipe 30 from downhill side 37 and through opening 140 of collar 50 from downhill side 76 and opening 151 of plate 150 to outlet 162 from inlet 161 within pathway P of pipe 30 opposite to the uphill sides of pipe 30 and collar 50, respectively. Opening 38 can be located elsewhere along pipe 50 as desired.

Clamp assembly 105 secures ears 80 and 100 in an illustrative embodiment. Clamp assembly 105 is easy to use, efficient, and effective. If desired, other clamp assembly forms or fasteners useful for fastening ears 80 and 100 together can be used. As a matter of example in FIGS. 8 and 9, ear 80 and ear 100 (not shown in FIG. 8) formed with openings for the reception of bolts 170 which collar 50 may be tightly clamped about an agricultural irrigation pipe. FIG.

Figure 8:
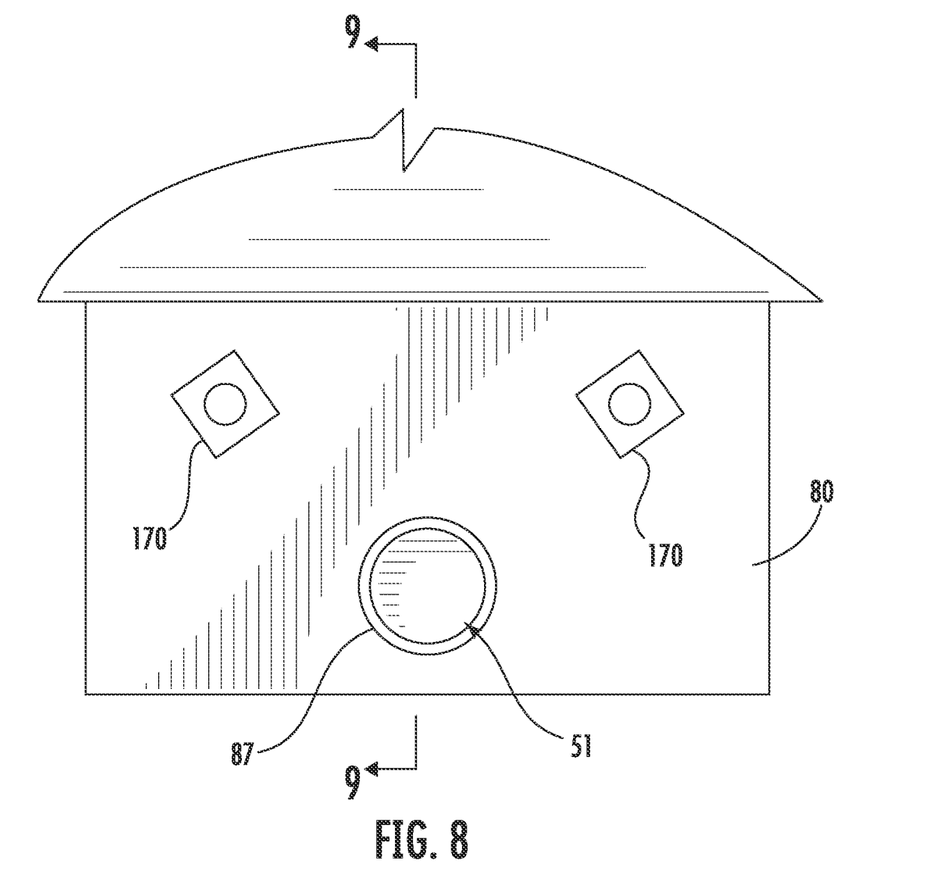
FIG. 8 is a fragmentary top plan view of an alternate embodiment of a collar according to the invention.
Figure 9:
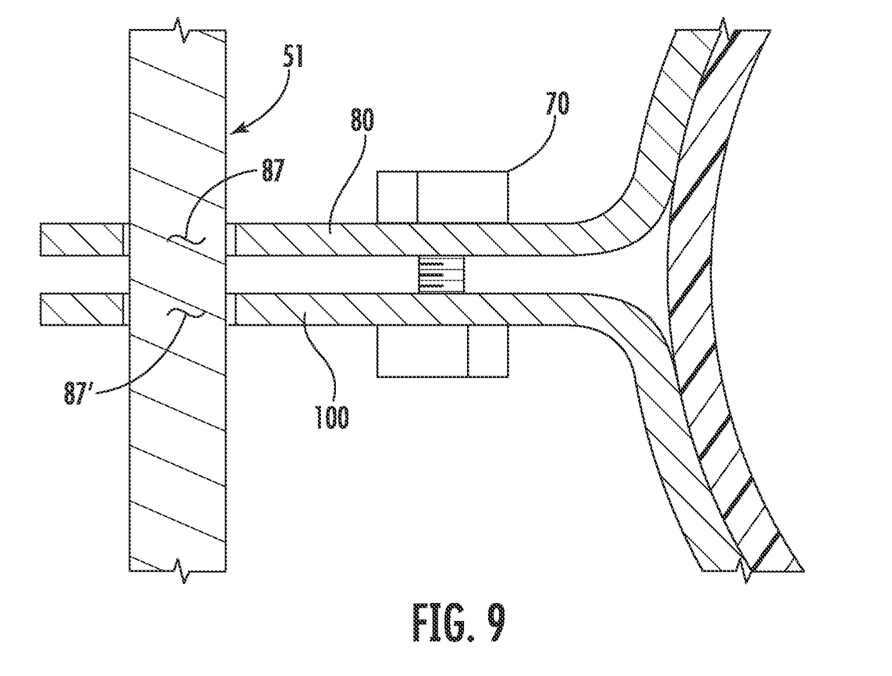
FIG. 9 is a section view taken along line 9-9 of FIG. 8.
Figure 10:
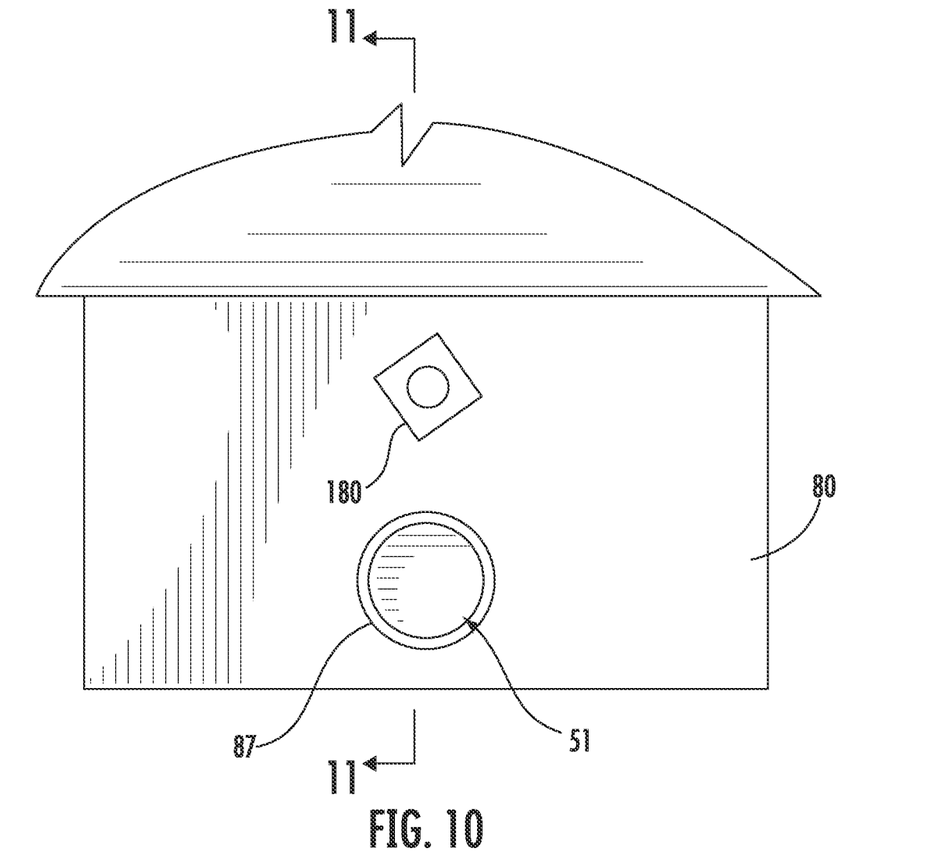
FIG. 10 is a fragmentary top plan view of another alternate embodiment of a collar according to the invention.
Figure 11:
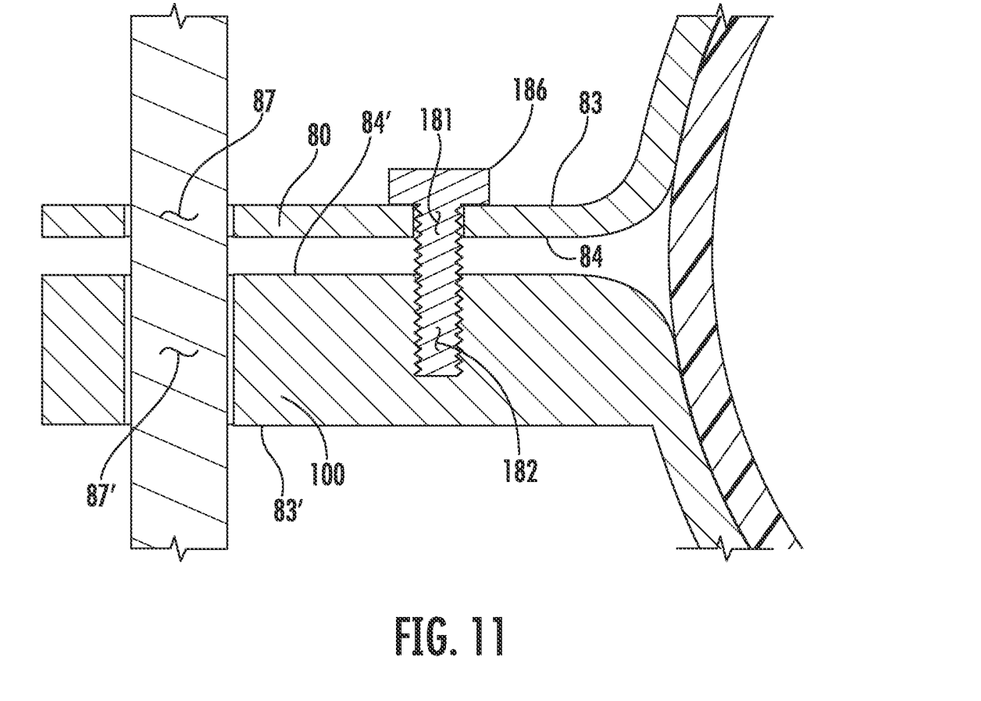
FIG. 11 is a section view taken along line 11-11 of FIG. 10.

8 shows two bolts 170, and less or more can be used. In another embodiment in FIGS. 10 and 11, ear 80 and ear 100 (not shown in FIG. 10) secured with bolt 180 in FIGS. 10 and 11. In FIG. 11, ears 80 and 100 are provided with an opening 181 and an internally threaded blind bore 182, respectively, for the reception of bolt 180 through which collar 50 may be tightly clamped about an agricultural irrigation pipe. In the example shown in FIG. 11, opening 181 extends through ear 80 from outer surface 83 to inner surface 84, and internally threaded blind bore 182 extends downwardly into ear 100 through its inner surface 84'. Ear 100 has a thickness from its outer surface 83' to its inner surface 84' that is sufficient for internally threaded blind bore 182 and the reception of bolt 180 therein. Although one bolt 180 is shown in the embodiment of FIGS. 10 and 11, more than one bolt 180 can be used.

Various further changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. In an agricultural irrigation water pipe extending transversely across a surface of a hillside, improvements therein comprising:
   a collar about the agricultural irrigation water pipe and being split defining opposed first and second ends;
   an upper ear and a lower ear carried by the collar proximate to the first end and the second end, respectively, the upper ear overlies the lower ear, and both the upper ear and the lower ear concurrently extend uphill over the surface of the hillside from the collar and are secured, tightening the collar about the agricultural irrigation water pipe; and
   a stake releasably coupled to both the upper ear and the lower ear and staked into the hillside through the surface from both the upper ear and the lower ear, anchoring the collar to the hillside disabling the agricultural irrigation water pipe from sliding or rolling down the surface of the hillside.

2. The improvements according to claim 1, wherein the stake extends through a first opening and a second opening through the upper ear and the lower ear, respectively, releasably coupling the stake to the upper ear and the lower ear.

3. The improvements according to claim 1, wherein the upper ear and the lower ear are secured by a clamp assembly.

4. The improvements according to claim 1, wherein the upper ear and the lower ear are secured by at least one fastener.

5. The improvements according to claim 1, wherein the collar includes an aperture coupled in fluid communication with the irrigation water pipe.

6. The improvements according to claim 5, further comprising a device coupled in fluid communication with the aperture and configured to control a direction or characteristics of a fluid flow.

* * * * *